(12) United States Patent
Faraut et al.

(10) Patent No.: US 11,227,732 B2
(45) Date of Patent: Jan. 18, 2022

(54) ELECTROSTATIC BRAKE FOR PERIPHERAL DEVICE BUTTONS

(71) Applicant: Logitech Europe S.A., Lausanne (CH)

(72) Inventors: Victor Faraut, Rolle (CH); Jan Stoeckli, Jongny (CH)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 16/863,694

(22) Filed: Apr. 30, 2020

(65) Prior Publication Data

US 2021/0343489 A1 Nov. 4, 2021

(51) Int. Cl.
*H01H 13/79* (2006.01)
*G06F 3/02* (2006.01)
*H01H 13/807* (2006.01)

(52) U.S. Cl.
CPC ........... *H01H 13/79* (2013.01); *G06F 3/0202* (2013.01); *H01H 13/807* (2013.01)

(58) Field of Classification Search
CPC ..... H01H 13/79; H01H 13/807; G06F 3/0202
USPC ........................................................ 200/5 A
See application file for complete search history.

(56) References Cited

U.S. PATENT DOCUMENTS

| | | | |
|---|---|---|---|
| 2008/0223706 A1* | 9/2008 | Hagiwara | G06F 3/0338 200/5 A |
| 2012/0285808 A1* | 11/2012 | Huang | H01H 13/705 200/5 A |

\* cited by examiner

*Primary Examiner* — Edwin A. Leon
*Assistant Examiner* — Iman Malakooti
(74) *Attorney, Agent, or Firm* — Kilpatrick Townsend & Stockton LLP

(57) ABSTRACT

A peripheral device for a computing system comprises an electrical switch and a user depressible button. An electrostatic brake is attached to the user depressible button and controls a force profile of the keystroke of the user depressible button. The button is coupled to and is configured to actuate the electrical switch at the end of the keystroke. A movable electrode is coupled to the depressible button and a stationary electrode is positioned parallel to and proximate the movable electrode. A dielectric material is positioned between the movable electrode and the stationary electrode forming an electrostatic brake. An electrical circuit is coupled to the first and the second electrodes and is configured to apply a voltage potential between the first and the second electrodes to apply a resistive force to the depressible button.

19 Claims, 9 Drawing Sheets

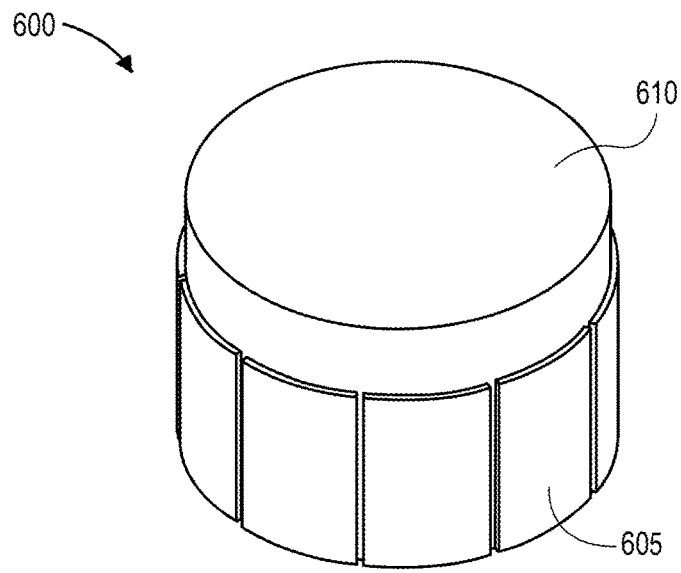
FIG. 6
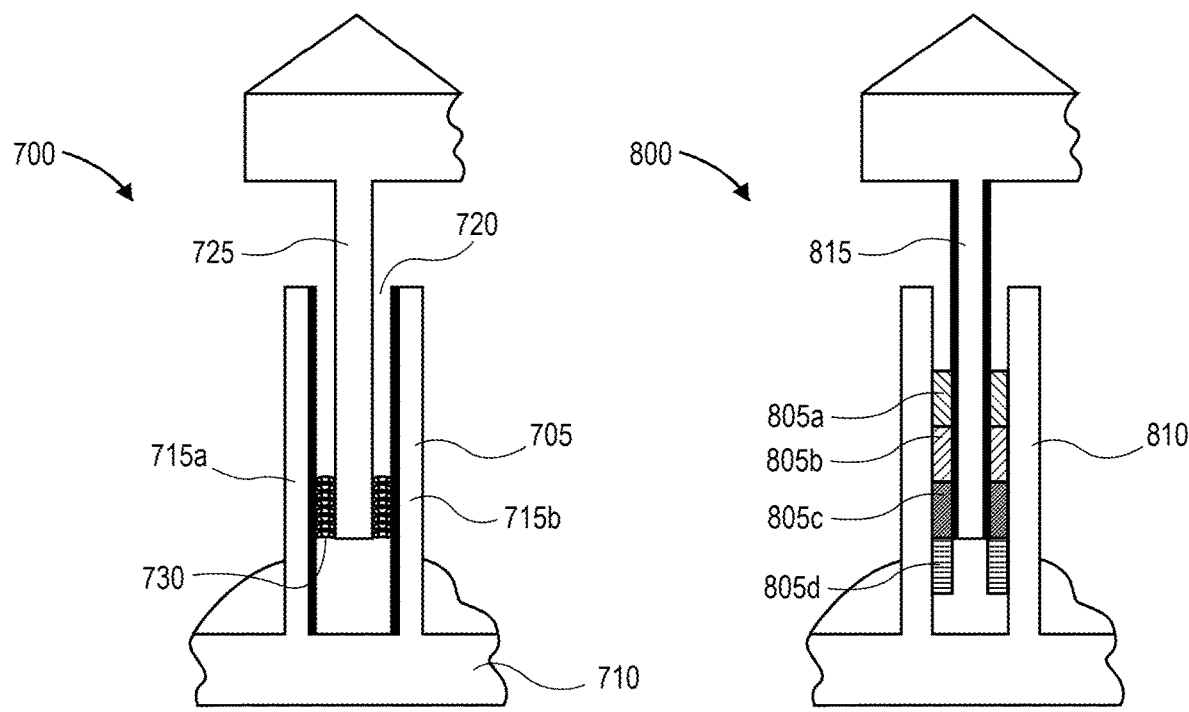
FIG. 7  FIG. 8

ELECTROSTATIC BRAKE FOR PERIPHERAL DEVICE BUTTONS

FIELD

The described embodiments relate generally to peripheral devices that employ one or more user actuated switches. More particularly, the present embodiments relate to controlling the amount of force and/or the force profile required to actuate the one or more switches.

BACKGROUND

Currently there are a wide variety of peripheral devices that include one or more user actuated switches (e.g., keyboards, mice, trackballs, foot pedals, shifters, levers, etc.) that a user actuates to interact with a computing device. The feel of the actuated switches (e.g., force profile) is usually set by the manufacturer and is not able to be adjusted by the user to fit the user's particular preferences. New peripheral devices are needed that have adjustable force profiles for user actuated switches that the user can tailor to their particular needs.

SUMMARY

In some embodiments a computer peripheral device comprises a depressible button and an electrical switch coupled to the depressible button where the electrical switch is configured to output an electrical signal indicative of a position of the depressible button. A movable electrode is coupled to the depressible button and a stationary electrode is positioned parallel to and proximate the movable electrode. A dielectric is positioned between and electrically insulating the movable electrode and the stationary electrode. An electrical circuit is coupled to the movable and the stationary electrode. The electrical circuit is configured to apply a voltage potential difference between the movable electrode and the stationary electrode.

In some embodiments the stationary electrode comprises a pair of parallel plates and the movable electrode is at least partially positioned between the pair of parallel plates. In various embodiments the electrical circuit is configured to change the applied voltage potential difference based on a position of the depressible button. In some embodiments the electrical circuit is configured to discharge the applied voltage potential difference in response to the depressible button passing a threshold distance. In various embodiments the depressible button is one of a plurality of depressible buttons and the applied voltage potential difference can be different for each depressible button. In some embodiments the depressible button is a key of a keyboard. In various embodiments the depressible button is a selection button of a mouse.

In some embodiments a computer peripheral device comprises a depressible button coupled to an electrical switch, wherein the electrical switch is configured to output an electrical signal indicative of a position of the depressible button. In various embodiments a first electrode is coupled to the depressible button and a second electrode is positioned adjacent the first electrode. A dielectric is positioned between the first and the second electrodes. The first and second electrodes and the dielectric comprise an electrostatic brake.

In some embodiments the first electrode is a movable electrode and moves with the depressible button. In various embodiments the peripheral device further comprises an electrical circuit configured to apply a voltage potential difference across the first and the second electrodes. In some embodiments the electrical circuit is configured to change the applied voltage potential difference in response to the position of the depressible button. In various embodiments the electrical circuit is configured to discontinue applying the voltage potential difference in response to the depressible button passing a threshold distance. In some embodiments the depressible button is a key of a keyboard.

In some embodiments a computer peripheral device comprises an electrical switch coupled to a depressible button wherein the electrical switch outputs an electrical signal indicative of a position of the depressible button. An electrostatic brake is attached to the depressible button. In some embodiments the electrostatic brake comprises a stationary electrode positioned adjacent a movable electrode, wherein the movable electrode is coupled to the depressible button. In various embodiments the peripheral device further comprises a dielectric positioned between and electrically insulating the stationary electrode and the movable electrode.

In some embodiments the peripheral device further comprises an electrical circuit that is configured to apply a voltage potential difference to the electrostatic brake to resist movement of the depressible button. In various embodiments the electrical circuit is configured to change the applied voltage potential difference such that the depressible button has a depression force profile. In some embodiments the electrical circuit is configured to discharge the applied voltage potential difference in response to activation of the electrical switch. In various embodiments the depressible button is a key of a keyboard.

These and other embodiments of the invention along with many of its advantages and features are described in more detail in conjunction with the text below and attached figures.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evident to the contrary from the description, where elements in different figures use identical reference numbers, the elements are generally either identical or at least similar in function or purpose.

BRIEF DESCRIPTION OF THE DRAWINGS

FIG. 6 illustrates a simplified isometric view of an embodiment of an electrostatic brake, according to embodiments of the disclosure;

FIG. 7 illustrates a partial cross sectional view of a ring-type moving electrode having constant interfacial area, according to embodiments of the disclosure;

FIG. 8 illustrates a partial cross-sectional view of an electrostatic brake having sequential electrodes, according to embodiments of the disclosure;

DETAILED DESCRIPTION

Techniques disclosed herein relate generally to peripheral devices that are employed by a user to interact with a computing device. More specifically, techniques disclosed herein relate to peripheral devices that include one or more user-actuated switches that have an adjustable force profile such that a user can tailor the "feel" of the switch to their particular needs. Various inventive embodiments are described herein, including methods, processes, systems, devices, and the like.

In order to better appreciate the features and aspects of the present disclosure, further context for the disclosure is provided in the following section by discussing two particular implementations of peripheral devices that include user actuated switches with adjustable force profiles, according to embodiments of the disclosure. These embodiments are for explanatory purposes only and other embodiments may be employed in other electronic devices. For example, embodiments of the disclosure can be used with any peripheral electronic device and more generally any electronic device that includes a user actuated switch. In some instances, embodiments of the disclosure are particularly well suited for use with keyboards and mice because of the user actuated switches that are typically incorporated within such devices. This disclosure further includes the use of any type of electrostatic force to control the force profile of a switch including but not limited to, electrostatic attraction, electrostatic repulsion and/or electrostatic friction.

For example, in some embodiments a keyboard includes a plurality of switches (e.g., keys) that have one or more electrostatic brakes attached thereto providing each key with an adjustable force profile. The electrostatic brakes are formed from an electrode attached to the depressible key positioned adjacent a stationary electrode and a dielectric material positioned therebetween. A voltage is applied between the electrodes causing an attractive force between the electrodes resulting in friction that a user perceives as resistance to movement of the key. The braking force can be dynamically adjusted by changing the applied voltage during the keystroke to provide a tailored force profile for one or more keys.

Figure 1:
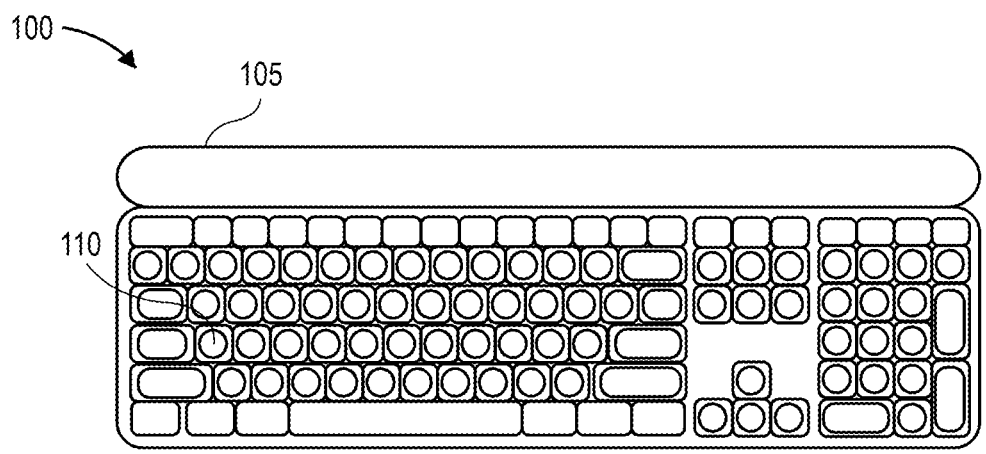
FIG. 1 depicts a simplified plan view of a peripheral device that includes one or more electrostatic brakes, according to embodiments of the disclosure.

FIG. 1 depicts a simplified plan view of a peripheral device 100, which in this embodiment is an electronic keyboard. As shown in FIG. 1, peripheral device 100 includes a housing 105 and a plurality of user actuated switches 110, (e.g., depressible keys) that are used as inputs for a computing system (not shown in FIG. 1). In some embodiments each user actuated switch 110 includes an electrostatic brake (not shown in FIG. 1) that can dynamically modify a force profile of each key such that a user can change the feel of one or more keys, as explained in more detail below.

In some embodiments the force profile of all of the keys can be changed, while in other embodiments the user can select a different force profile for each key and/or clusters of keys (such as specific keys that are used with gaming systems). Among other benefits the different force profiles can enable a keyboard to be tailored to a user's particular feel and can be customized for a different "feel" for specific applications such as word processing and gaming. In other embodiments the different force profiles for keys can assist with predictive typing tutor systems where the braking force is increased for incorrect keys and is decreased for correct keys. Similar features can be employed for gaming coaching systems to assist a user in the development of a more intuitive feel for which keys to press and the right timing for depressing specific keys. Myriad other applications and benefits can be realized by one of skill in the art.

Figure 2:
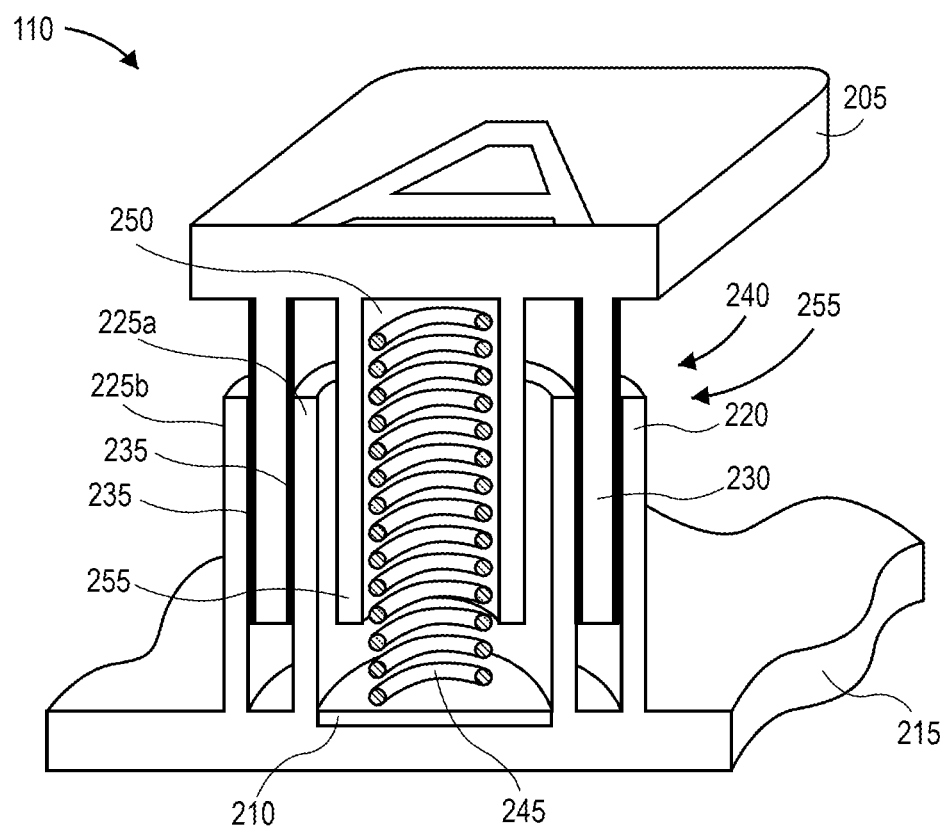
FIG. 2 illustrates a simplified partial cross-sectional view of a user actuated switch (e.g., depressible key) of the peripheral device illustrated in FIG. 1, according to embodiments of the disclosure.

FIG. 2 illustrates a simplified partial cross-sectional view of a user actuated switch 110 (e.g., depressible button) of peripheral device 100, according to embodiments of the disclosure. As shown in FIG. 2, switch 110 includes a user contact plate 205 also known as a "key cap" that the user depresses downward when actuation of a respective electrical switch corresponding to a particular key is desired. In some embodiments a braking force applied by an electrostatic brake 240 can be dynamically changed during a keystroke by sensing a position of key 110 (e.g., a position of plate 205 relative to a base 215) and using the position information to determine an appropriate voltage to apply to the electrostatic brake 240, as described in more detail herein.

In some embodiments electrostatic brake 240 is made from a stationary electrode 220 that extends from base 215, and in this embodiment includes two parallel stationary plates 225a, 225b, however other embodiments can have different configurations. Electrostatic brake 240 also includes a moving electrode 230 that extends from plate 205, and in this embodiment is a single plate that is positioned between parallel stationary plates 225a, 225b. A dielectric 235 is positioned between stationary electrode 220 and moving electrode 230 to electrically isolate the stationary and moving electrodes. Stationary electrode 220, moving electrode 230 and dielectric 235 form a capacitive structure that are collectively referred to herein as an electrostatic brake 240.

In some embodiments electrostatic brake 240 forms attractive forces between stationary electrode 220 and moving electrode 230 when a voltage potential is applied between the stationary and the moving electrodes. The attractive forces, in combination with the friction between stationary electrode 220 and moving electrode 230, generate a braking force that resists movement of plate 205 towards base 215 and generates a force profile (e.g., "feel") that can be customized by the user and can be varied depending on a position of plate 205. More specifically, as a user depresses plate 205, the resisting force (e.g., braking force) can be dynamically changed to compensate for changes in static and dynamic friction, compensate for changing electrode contact area and can dynamically change the force profile (e.g., "feel") of the keystroke throughout the depression. As discussed above, one method of changing the braking force is to change a voltage potential between stationary and moving electrodes, 220, 230, respectively.

To sense the position of plate 205, electrical switch 255 is coupled to plate 205 and is configured to output an electrical signal indicative of a position of the plate. In some embodiments electrical switch 255 is formed from stationary electrode 220 and moving electrode 230. More specifically, to sense a position of contact plate 205, circuitry can temporarily discharge the voltage applied to electrostatic brake 240, sense the capacitance between the stationary electrode 220 and moving electrode 230, then reapply the voltage. This can be repeated very quickly during a keystroke so the voltage applied to electrostatic brake 240 can be dynamically adjusted, as discussed in more detail herein. In other embodiments a separate stationary electrode and moving electrode (not shown in FIG. 2) can form electrical switch 255. In yet further embodiments a pressure sensitive electrical switch 210 can sense position of user contact plate 205 via pressure exerted on compression spring 245. In other embodiments one or more proximity sensors, optical sensors, capacitive sensors, magnetic sensors, Hall-effect sensors or other devices can be used to sense a real-time position of plate 205, as discussed in more detail below.

During the depression of plate 205, a compression spring 245 that is housed within a plunger cavity 250, is compressed. At the end of the keystroke (e.g., when a particular displacement threshold for contact plate 205 is reached), electrostatic brake 240 is released and compression spring 245 returns plate 205 to its original position. In some embodiments compression spring 245 can be a metallic spring, an electrically insulative spring, a rubber dome, a leaf spring or any other type of physically resistive device.

In some embodiments plate 205 and moving electrode 230 are a monolithic injection molded plastic component that includes selective electroplating on the electrode regions to form moving electrode 230. In various embodiments stationary electrode 220 can be formed from plastic that is injection molded and selectively plated to form stationary electrode plates 225a, 225b.

In some embodiments dielectric 235 can be applied to stationary electrode 220, moving electrode 230, or to both stationary and moving electrodes. In one embodiment the dielectric is polyimide and is between 5 microns and 50 microns thick and may have one or more coatings or surface finishes to adjust the braking force. In another embodiment the selective plating of the electrodes includes nickel and/or copper.

In some embodiments compression spring 245 can be electrically conductive and can couple voltage applied to moving electrode 230 from the base 215 to the moving electrode. In other embodiments plunger 255 can be removed and compression spring 245 can be non-electrically conductive. In further embodiments, electrostatic brake 240 can have other geometries and configurations, some of which are described in more detail below. In one embodiment, electrostatic brake 240 includes flat plate-type electrodes as opposed to the cylindrical electrodes illustrated in FIG. 2. In some embodiments a coupling between compression spring 245 and stationary electrode 220 can be used as a position sensor. More specifically, as compression spring 245 applies more force to stationary electrode 220 electrical coupling between the two components can be increased and/or a pressure sensitive device can be used as a position sensor.

Figure 3:
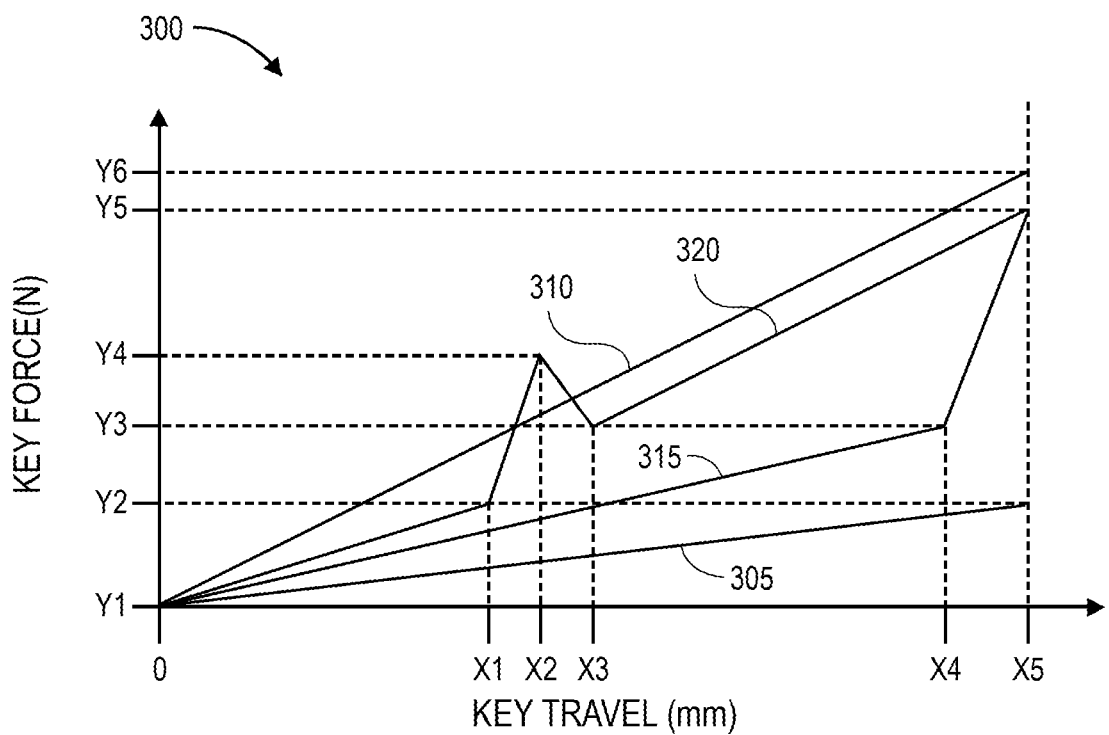
FIG. 3 illustrates a graph showing three different example keystroke force profiles, according to embodiments of the disclosure.

FIG. 3 illustrates a force profile graph 300 showing four different example keystroke force profiles, according to embodiments of the disclosure. As shown in FIG. 3, the keystroke force profiles can be changed by a user to suit their preferences for the particular feel they want. In graph 300, keystroke travel is on the X-axis and key force (i.e., the force exerted by a user on the key) is on the Y-axis. First keystroke force profile 305 is substantially linear such that the force increases linearly to an ending force of Y2 as the key is depressed. Once the key reaches a threshold depression distance, the electrostatic brake is released so the key can rebound to its starting position. Second keystroke force profile 310 is also substantially linear, but presents the user with an increased resistance such that the force increases to a force of Y6 at the end of the keystroke.

Third keystroke force profile 315 is also substantially linear up to a force of Y3, at a keystroke distance of X4, however from keystroke distance X4 to keystroke distance X5 a slope of the keystroke force profile increases to a force of Y5 at the end of the keystroke. This profile may enable a user to sense a noticeable change in resistance when reaching the end of the keystroke. Fourth keystroke profile 320 is also substantially linear up to a force of Y2 and a keystroke distance of X1, however then the user experiences a significant increase in resistance to a force of Y4 at a distance of X2, then the force reduces quickly to a force of Y3 at a distance of X3 and is linear again to the end of the keystroke X5. Keystroke profile 320 may provide a user a "clicky" feel for the keys due to the rapid increase followed by the rapid decrease in resisting force. One of ordinary skill, with the benefit of this disclosure, would recognize many variations, modifications, and alternatives keystroke profiles that include but are not limited to, non-linear profiles, increasing then decreasing profiles, exponential profiles and reverse profiles.

Figure 4:
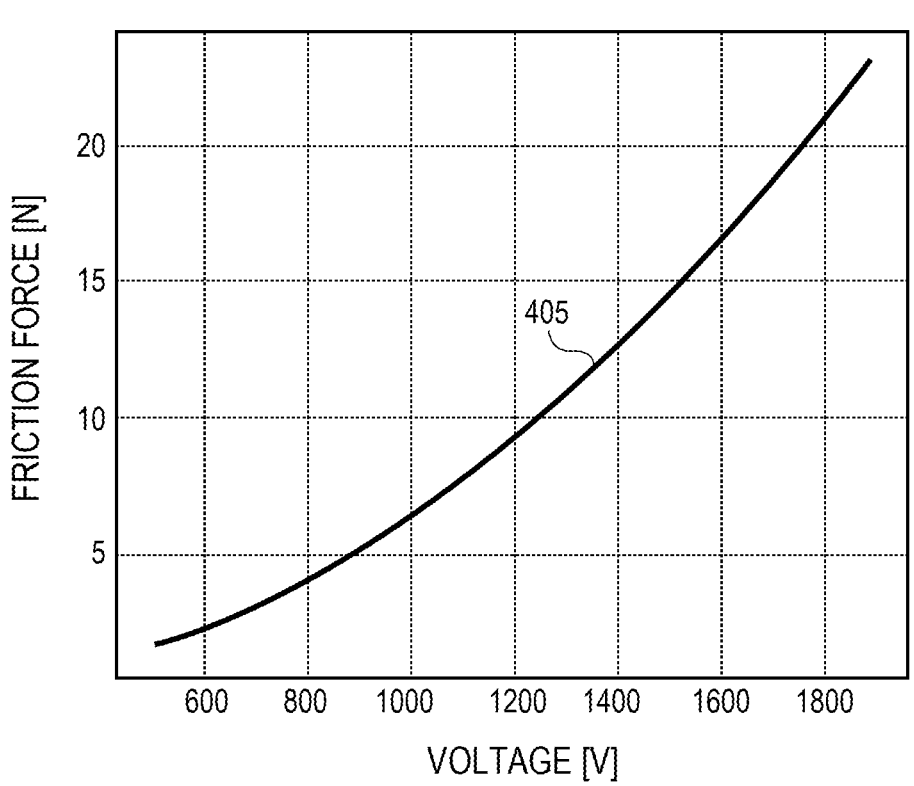
FIG. 4 illustrates a graph showing an example electrostatic brake friction force versus applied voltage curve, according to embodiments of the disclosure.

FIG. 4 illustrates a friction force graph 400 showing an example of how electrostatic brake friction force can be varied with applied voltage using curve 405 for an example electrostatic brake, according to embodiments of the disclosure. As shown in FIG. 4, curve 405 illustrates the force required to slide one electrode relative to the other electrode (e.g., moving electrode relative to stationary electrode) with respect to a voltage applied between the electrodes. The friction force at a given voltage depends on the instantaneous area between the electrodes, the applied voltage potential and the dielectric material properties. As shown in FIG. 4, the force required to slide the electrodes relative to each other increases as the voltage is increased between the electrodes, which increases the electrostatic attraction between the electrodes. The following equations can be used to calculate the theoretical force between the electrodes to generate curve 405:

$$F_{compression} = \frac{\varepsilon_i \varepsilon_0 A V^2}{2d^2} \quad \text{(Eq. 1)}$$

Where:
A=instantaneous overlapping area of electrodes
V=voltage between electrodes
d=distance between electrodes
ε=relative permeability of dielectric f=switching frequency As shown in FIG. 4, curve 405 is for one particular example electrostatic brake in which the dielectric is 15 microns thick polyimide with an electrode overlap area of 10 mm×40 mm wide. At approximately 1000 Volts the friction force between the electrodes is approximately 6.5 Newtons. Increasing the voltage 50 percent to 1500 Volts increases the friction force to approximately 15 Newtons, nearly a threefold increase. Curve 405 can be tailored by changing the dielectric material and/or properties, the electrode areas and/or shapes, the surface finish of the dielectric material and other features. One of ordinary skill, with the benefit of this disclosure, would recognize many variations, modifications, and alternatives.

To generate a particular force profile as illustrated in FIG. 3, the instantaneous overlapping area of the stationary electrode and movable electrode are used along with friction force curve 405 in FIG. 4 to determine an appropriate voltage to achieve the desired braking force. In designs where the instantaneous area between the electrodes changes throughout the keystroke, the voltage may need to be dynamically varied throughout the keystroke to achieve a linear force profile. However, in some embodiments the electrodes can be designed such that the instantaneous change in area between the electrodes can yield the desired force profile while applying a constant voltage between the electrodes.

In yet further embodiments the stationary electrode and movable electrode can be designed such that the area between them does not change during the keystroke and therefore the keystroke force profile can be changed by adjusting the applied voltage without compensating for changes in electrode area. Yet further embodiments can include multiple pairs of parallel electrodes that enable an increase in braking force. Other embodiments can include gaps, voids and/or separations formed in one or more electrodes to change the instantaneous overlapping area of the electrodes. Yet further embodiments can include individual sequential electrodes that have different applied voltages to adjust the force profile, as discussed in more detail below. One of ordinary skill, with the benefit of this disclosure, would recognize many variations, modifications, and alternatives.

Figure 5:
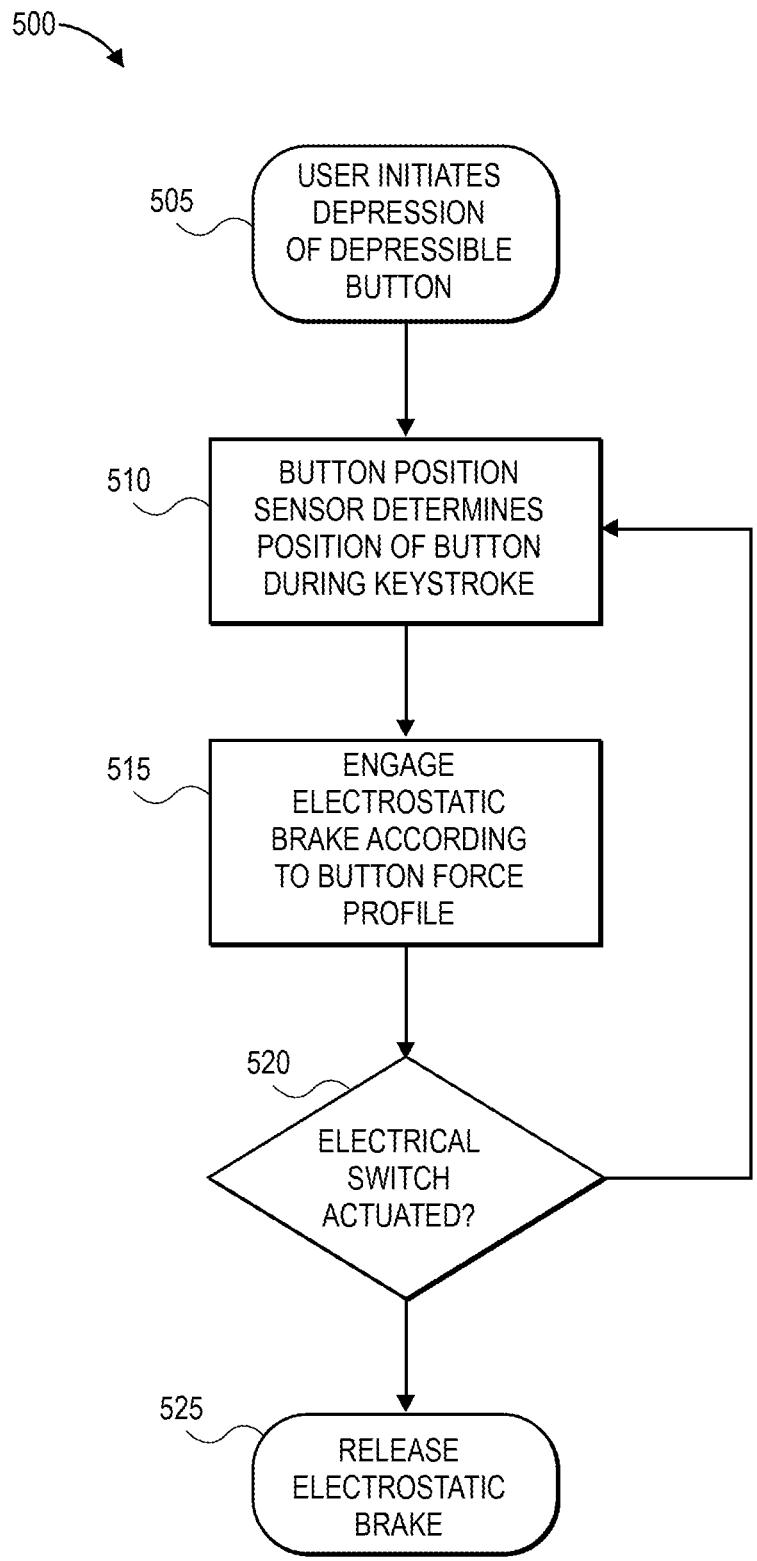
FIG. 5 illustrates steps associated with a method of using an electrostatic brake to control a force profile of a depressible button, according to embodiments of the disclosure.

FIG. 5 illustrates steps associated with a method 500 of using an electrostatic brake to control a force profile of a depressible button, according embodiments of the disclosure. As illustrated in FIG. 5, in step 505 user initiates depression of a depressible button. In other embodiments the depressible button can be a button on a different electronic peripheral such as a mouse or other device. In some embodiments the electrostatic brake on all of the buttons can be pre-charged (e.g., engaged) before a user initiates depression of the button, while in other embodiments the electrostatic brake for a button is not charged until the system determines that a user has initiated the depression of a button.

In step 510 a button position sensor determines a position of the button during the keystroke. In some embodiments the change in position can be detected by a capacitive sensor that uses the stationary and moving electrodes, while in other embodiments a position of the button is determined using an optical sensor, an inductive sensor, a Hall effect sensor or any other type of sensing device. In one embodiment an instantaneous capacitance between the electrodes can be used to determine a position of the button during brief periods when the electrostatic brake is discharged.

In step 515 the electrostatic brake is charged according to a predetermined button force profile. The button force profile can be set by a user or preset by a manufacturer. The button force profile can be controlled by adjusting an applied voltage between the electrodes. In some embodiments the applied voltage is continuously varied during the keystroke using data obtained from the button position sensor to achieve the desired button force profile. In other embodiments the applied voltage may be held constant and in some embodiments a change in instantaneous electrode overlap area can be used with a constant voltage to deliver a desired button force profile.

In step 520 the system determines if the electrical switch has been actuated. In some embodiments the actuation of the electrical switch occurs when the button is depressed past a particular threshold distance. In further embodiments the actuation distance can be determined by the user along with the force profile to provide the user with a fully customized keystroke feel. In one embodiment the threshold distance can be set very low (e.g., so only a small key displacement is needed to actuate the switch) and a high force profile can be set so the keys have a solid feel like a keyboard pad. In further embodiments, the actuation of the switch can be set to occur before the keystroke reaches the end so a user experiences a "faster" response and the release of the brake can occur after the actuation of the switch. In yet further embodiments the electrical switch can be actuated by the plunger 255 (see FIG. 2) reaching the end of the keystroke and physically engaging an electrical switch. In other embodiments other types of switches can be used including, but not limited to a flexible metallic switch mounted on the side of the key that makes or breaks electrical contact at the end of the keystroke.

In some embodiments, if the electrical switch has not been actuated the button position sensor continues to sense the change in position of the button as the user depresses it and the electrostatic brake is engaged according to the button force profile. However, if the electrical switch has been actuated the electrostatic brake can be released by discharging the voltage applied between the electrodes. When the electrostatic brake is released the compression spring applies an upward force to the button which returns it to its starting position. In further embodiments the electrostatic brake can remain engaged on the return keystroke. This can slow the rebound speed of the key and/or the key could be held in the depressed position for a period of time and/or the key could rebound and afterward the electrostatic force could be substantially increased giving the user an indication that the key should not be depressed again. One of ordinary skill, with the benefit of this disclosure, would recognize many variations, modifications, and alternatives.

FIG. 6 illustrates a simplified isometric view of another embodiment of an electrostatic brake 600, according to embodiments of the disclosure. As shown in FIG. 6, in this embodiment an outer electrode 605 is broken into segments such that it can conform to a center electrode 610 and apply frictional force between the two electrodes. In other embodiments the electrostatic brake can have a square or rectangular geometry instead of circular geometry. In some embodiments one or more of outer electrodes 605 can be used as a capacitive position sensor.

FIG. 7 illustrates a partial cross-sectional view of an electrostatic brake 700 that uses a ring type electrode, according to embodiments of the disclosure. As shown in FIG. 7 stationary electrode 705 extends from base 710 and includes two parallel plates 715a, 715b with a channel 720 formed therebetween. Moving electrode 725 is positioned between parallel plates 715a, 715b of stationary electrode 705 and includes an isolated active region 730 in the shape of a ring. More specifically, in this embodiment moving electrode 725 is not completely covered with an electrically conductive material and only active region 730 is electrically conductive. As moving electrode 725 moves up and down between parallel plates 715a, 715b of stationary electrode 705, the active ring area is the only capacitively coupled region between the electrodes and thus the instantaneous area between moving electrode 725 and stationary electrode 705 does not change throughout the keystroke. Therefore, with such embodiments, if a constant resistive force is desired a constant voltage can be applied between stationary electrode 705 and moving electrode 725.

FIG. 8 illustrates a simplified partial cross-sectional view of an electrostatic brake 800 having sequential electrodes, according to embodiments of the disclosure. As shown in FIG. 8 a series of separate electrostatic plates 805a, 805b, 805c, 805d are arranged vertically as a part of stationary electrode 810. In some embodiments, each separate electrostatic plate 805a, 805b, 805c, 805d can have a different applied voltage potential. In various embodiments separate electrostatic plates 805a, 805b, 805c, 805d can be a portion of the stationary electrode (as shown in FIG. 8) while in other embodiments they can form a portion of the moving electrode. As moving electrode 815 progresses from first separate electrostatic plate 805a to last separate electrostatic plate 805d a difference in applied voltage between each separate electrostatic plate 805a, 805b, 805c, 805d can change an applied braking force between moving electrode 815 and stationary electrode 810. In such embodiments a force profile of the depressible button can be varied without instantaneously changing the applied voltage, but instead having different constant voltages applied to each separate electrostatic plate 805a, 805b, 805c, 805d. In yet further embodiments each of separate electrostatic plate 805a, 805b, 805c, 805d can have different areas in addition to a different applied voltage to achieve a desired force profile. One of ordinary skill, with the benefit of this disclosure, would recognize many variations, modifications, and alternatives.

Figure 9:
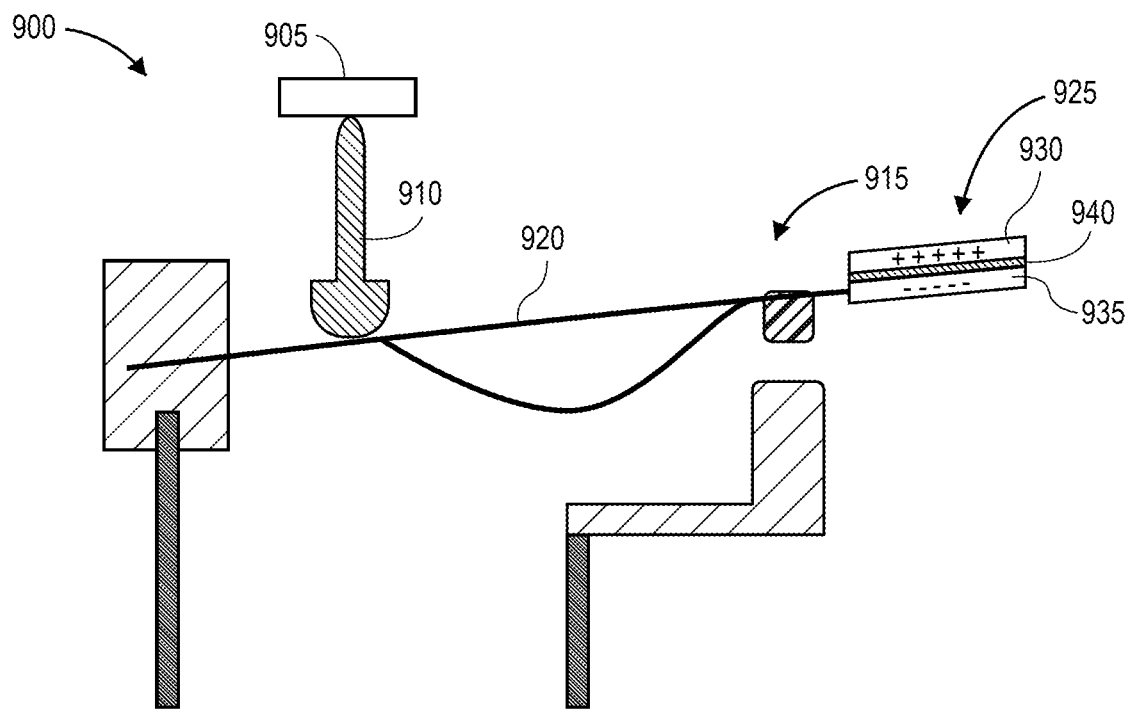
FIG. 9 illustrates a simplified partial cross-sectional view of a mouse button having an electrostatic brake, according to embodiments of the disclosure.

FIG. 9 illustrates a simplified partial cross-sectional view of a mouse switch 900 that includes an electrostatic brake, according to embodiments of the disclosure. As shown in FIG. 9, mouse switch 900 includes a user-depressible button 905 that is coupled to an actuator 910 to activate an electrical switch 915. Actuator 910 causes a spring mechanism 920 to move and actuate electrical switch 915. An electrostatic brake 925 can be attached to spring mechanism 920 and can change the amount of force it takes to activate electrical switch 915. More specifically, in some embodiments electrostatic brake 925 includes a stationary electrode 930 and a moving electrode 935. Stationary electrode 930 and moving electrode 935 can have a dielectric material 940 positioned between them and be charged with opposite charges such that they are attracted to each other. The force of attraction can be varied by changed the applied voltage between stationary electrode 930 and moving electrode 935 which can tailor the force needed to activate electrical switch 915. Similarly, by applying like charges to stationary electrode 930 and moving electrode 935 the force and distance required to activate electrical switch 915 can be reduced as the moving electrode is pushed away from the stationary electrode.

Figure 10:
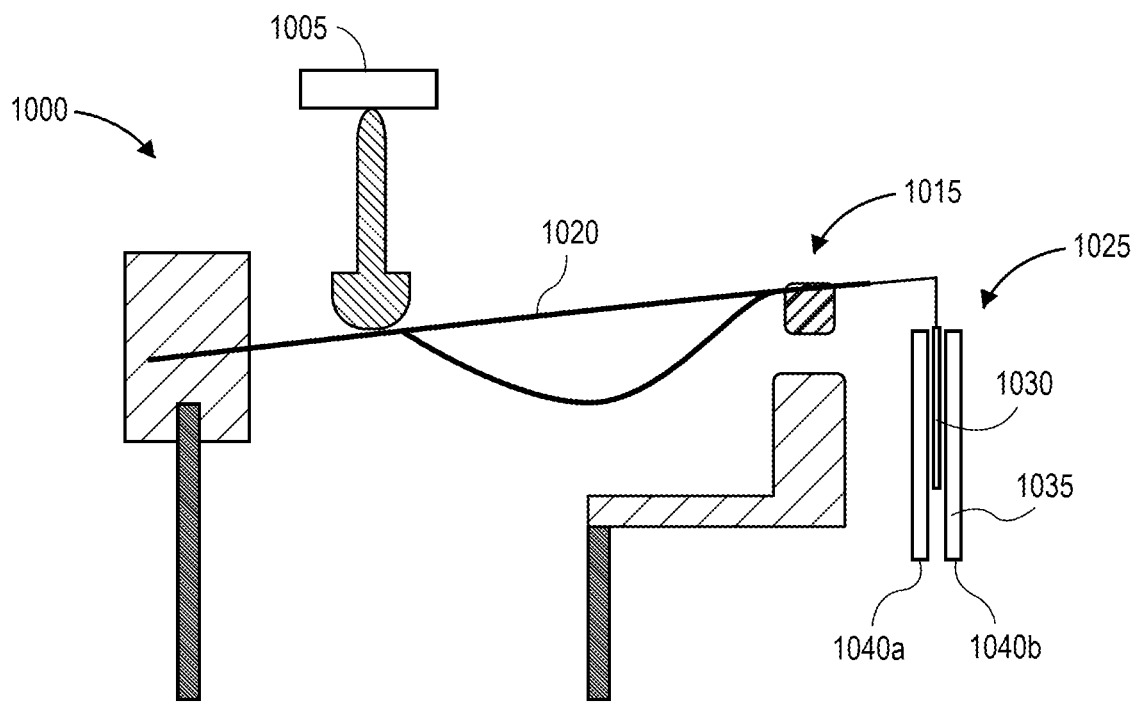
FIG. 10 illustrates a simplified partial cross-sectional view of a mouse button including an electrostatic brake, according to embodiments of the disclosure.

FIG. 10 illustrates a simplified partial cross-sectional view of a mouse switch 1000 that includes an electrostatic brake, according to embodiments of the disclosure. As shown in FIG. 10 mouse switch 1000 is similar to mouse switch 900 shown in FIG. 9 however mouse switch 1000 includes an electrostatic brake 1025 that is arranged to use a frictional force to adjust the force profile of mouse button 1005. More specifically as shown in FIG. 10, stationary electrode 1035 includes two stationary electrode plates 1040a, 1040b and a moving electrode 1030 is attached to spring mechanism 1020. When electronic switch 1015 is activated by button 1005, moving electrode 1030 slides by stationary electrode 1035. By changing an applied voltage between stationary electrode 1035 and moving electrode 1030, the force profile for depressing button 1005 can be customized and dynamically adjusted. In some embodiments electrostatic brake 1025 can also be used as a position sensor for button 1005 by periodically discharging the applied voltage potential and capacitively sensing the relative position of the electrodes.

Figure 11:
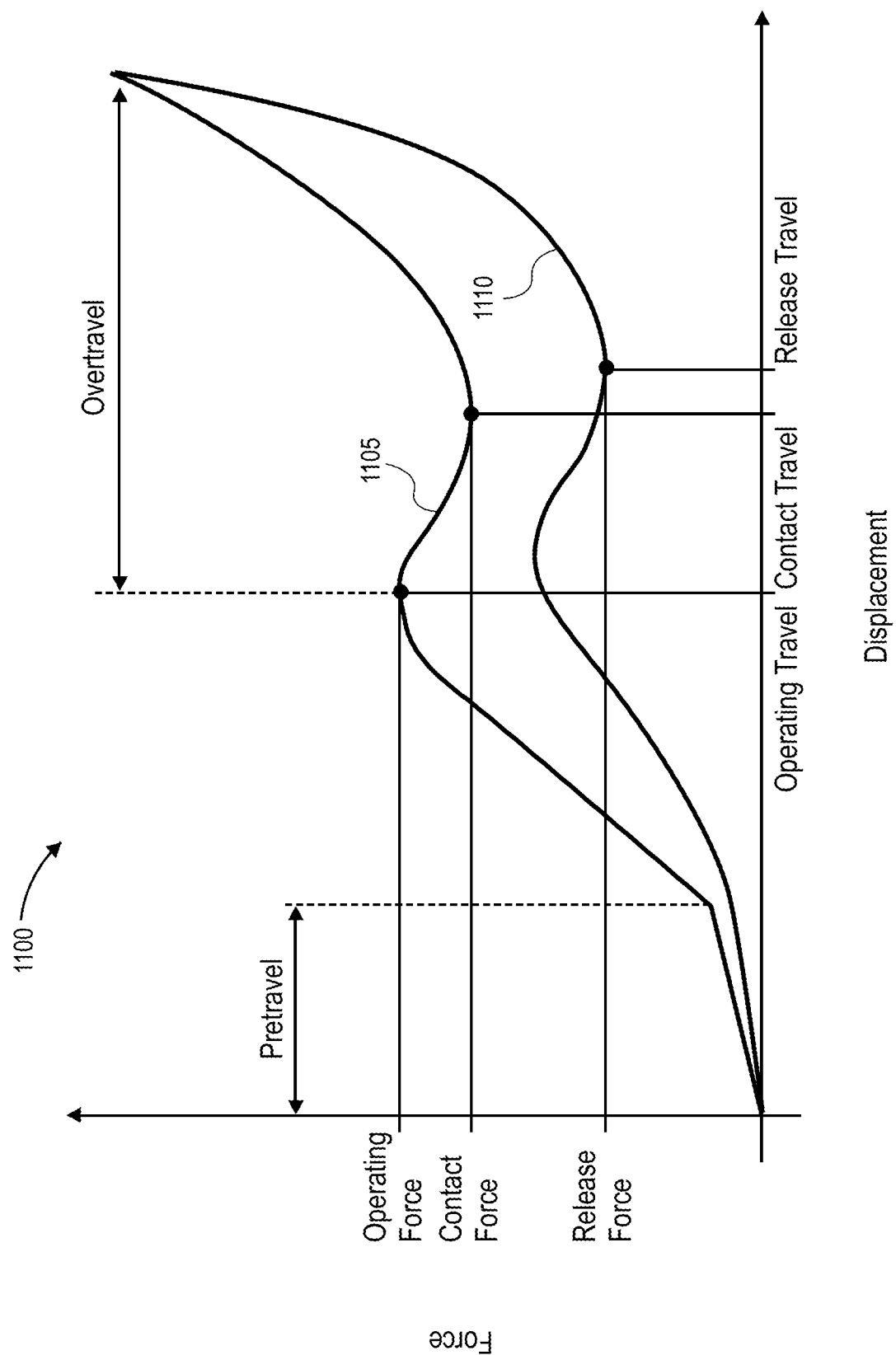
FIG. 11 illustrates a force profile for a depressible button having an electrostatic brake, according to embodiments of the disclosure.

FIG. 11 illustrates a force profile graph 1100 for a depressible button having an electrostatic brake, according to embodiments of the disclosure. As shown in FIG. 11, a first force profile 1105 represents the forces exerted on a button during a depression cycle. Second force profile 1110 represents the forces exerted on a button during its rebound cycle. Braking force can be varied on both the depression cycle and the rebound cycle to achieve any desired force profile.

Figure 12:
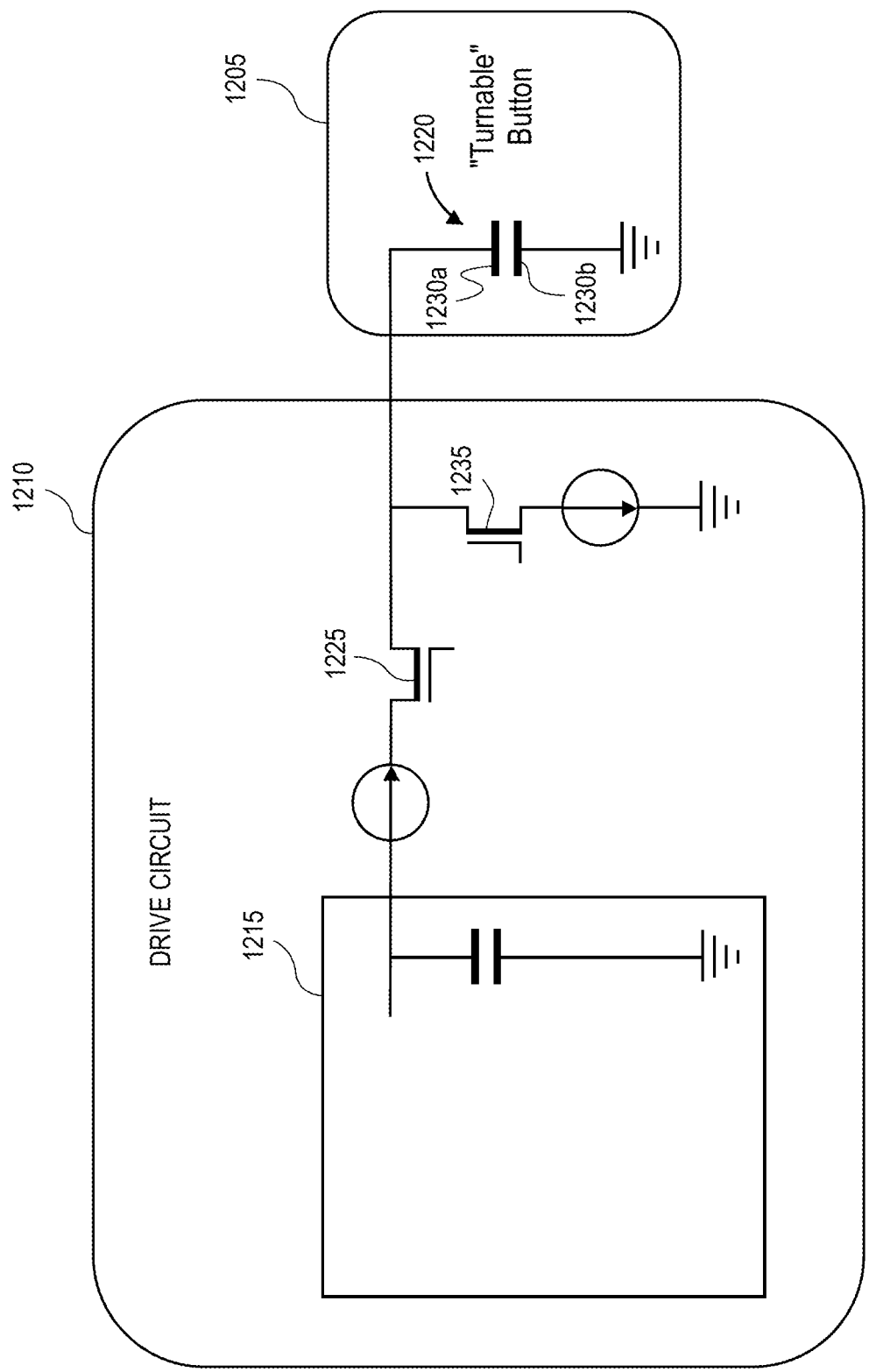
FIG. 12 illustrates a simplified schematic of a drive circuit for an electrostatic brake, according to embodiments of the disclosure.

FIG. 12 illustrates a simplified schematic of an electrostatic brake circuit 1200 for an single depressible button 1205, according to embodiments of the disclosure. As shown in FIG. 12 a drive circuit 1210 includes a power source 1215 such as a DC to DC converter, a capacitor bank or other type of power source. Power source 1215 supplies power to an electrostatic brake 1220 via first switch 1225. More specifically, when first switch 1225 is in a closed position voltage from power source 1215 is coupled to first electrode 1230a of electrostatic brake 1220 which charges the brake (e.g., engages the brake). To discharge electrostatic brake 1220, first switch 1225 is opened and a second switch 1235 is closed which allows the charge from first electrode 1230a of electrostatic brake 1220 to be discharged to ground. To instantaneously change the voltage applied to the electrostatic brake 1220 a regulator circuit such as, for example a buck or boost circuit can be formed as a portion of power source 1215 and can adjust the voltage delivered to first electrode 1230a. In some embodiments first and second switches 1225, 1235 can be solid-state switches, such as, but not limited to silicon-based transistors, gallium-nitride-based transistors or any other type of transistor device. In some embodiments additional circuitry may be used to sense a position of the switch.

Figure 13:
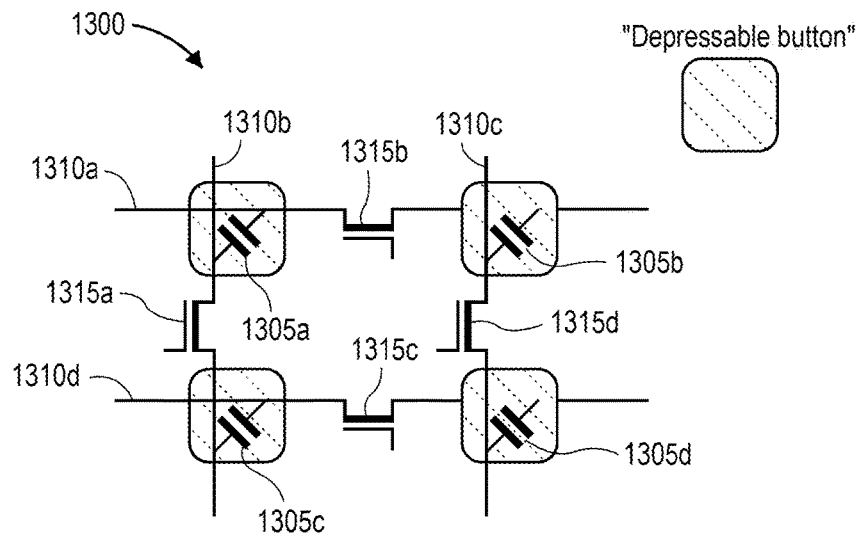
FIG. 13 illustrates a simplified schematic of a charge-sharing drive circuit for electrostatic brakes, according to embodiments of the disclosure.

FIG. 13 illustrates a simplified schematic of a charge-sharing electrostatic brake circuit 1300 for a group of four electrostatic brakes, according to embodiments of the disclosure. As shown in FIG. 13 circuit 1300 includes circuitry such that electrical charges are moved between electrostatic brakes, 1305a, 1305b, 1305c, 1305d whenever charge is needed. Power can be supplied via bus lines 1310a, 1310b, 1310c, 1310d and electrostatic brakes 1305a, 1305b, 1305c, 1305d can be controlled via switches 1315a, 1315b, 1315c, 1315d.

Figure 14:
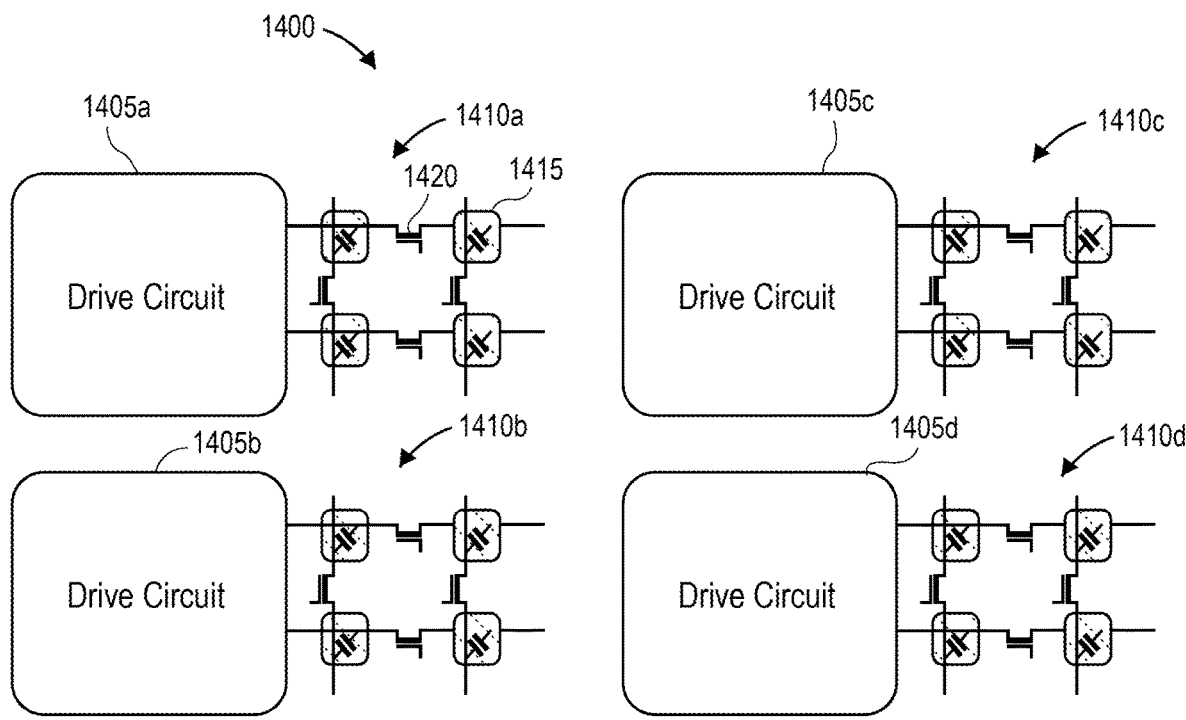
FIG. 14 illustrates a simplified schematic of a clustered charge-sharing drive circuit for electrostatic brakes, according to embodiments of the disclosure.

FIG. 14 illustrates a simplified schematic of a clustered charge-sharing circuit 1400 for a plurality of electrostatic brakes, according to embodiments of the disclosure. As shown in FIG. 14, separate drive circuits 1405a, 1405b, 1405c, 1405d each supply power to a respective cluster 1410a, 1410b, 1410c, 1410d of depressible buttons 1415. In some embodiments depressible buttons 1415 can be matrixed to reduce the number of switches 1420 needed, however this configuration may result in only one electrostatic brake being be changed at a time. In another embodiment depressible buttons 1415 can be clustered into a matrix that a user is unlikely to depress more than one button at a single time. For example one cluster may include keys "X" and "W" which are unlikely to be pressed right after each other. This may enable time to recover and reset the electrostatic brake circuit between key depressions. In another embodiment the "A", "S", "W", "D" keys and the spacebar are often used simultaneously in gaming applications so these keys could be put into separate clusters. One of ordinary skill, with the benefit of this disclosure, would recognize many variations, modifications, and alternatives.

Figure 15:
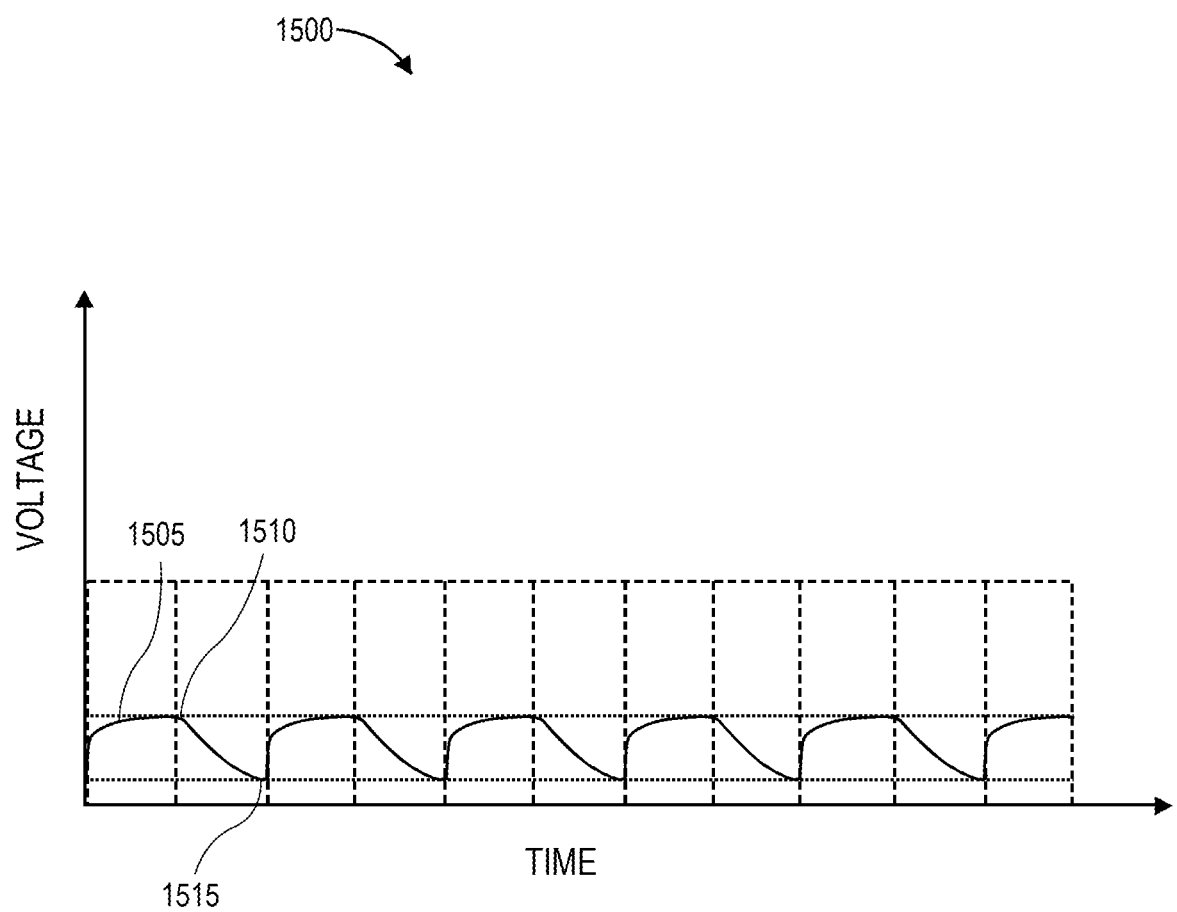
FIG. 15 illustrates a signal plot showing pulse-type charging and capacitive position sensing of an electrostatic brake, according to embodiments of the disclosure.

FIG. 15 illustrates a simplified signal plot 1500 showing pulse-type charging and capacitive position sensing of an electrostatic brake, according to embodiments of the disclosure. As shown in FIG. 15, an electrostatic brake can be sequentially charged, discharged, sensed and recharged. More specifically, in one embodiment a pulse width modulated (PWM) signal can control charging, discharging and sensing cycles on a particular electrostatic brake. The charging (e.g., the regions of high voltage 1505 and the apex 1510) can apply a frictional braking force to an electrostatic brake to generate a force profile for depressible button. The discharging cycle (e.g., the valleys 1515) can drain the charge from the electrostatic brake such that a position of the depressible button can be sensed by sensing the capacitance between the electrodes. After the capacitance is sensed the electrostatic brake can be recharged according to the desired force profile. One of ordinary skill, with the benefit of this disclosure, would recognize many variations, modifications, and alternatives.

Although peripheral device 100 (see FIG. 1) is described and illustrated as one particular electronic device, embodiments of the disclosure are suitable for use with a multiplicity of peripheral and general electronic devices. For example, any device that includes one or more user-depressible buttons can be used with embodiments of the disclosure. In some instances, embodiments of the disclosure are particularly well suited for use with peripheral electronic devices for computing systems because of their use for myriad applications and the desire of the user to customize them to the user's particular needs. As used herein, a peripheral device includes any electronic device that can be coupled to a computer or other electronic system. Such devices can include, for example, keyboards, mice, track balls, phones, music players, speaker systems, foot pedals, levers, gear shifters and steering wheels.

For simplicity, various internal components, such as control circuitry, ancillary components, bus, memory, storage devices and other components of the driver circuits (see FIGS. 12-14) are not shown in the figures.

In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments can be combined in any suitable manner without departing from the spirit and scope of embodiments of the disclosure.

Additionally, spatially relative terms, such as "bottom or "top" and the like can be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as a "bottom" surface can then be oriented "above" other elements or features. The device can be otherwise oriented (e.g., rotated 90 degrees or at other orientations) and the spatially relative descriptors used herein interpreted accordingly.

What is claimed is:

1. A computer peripheral device comprising:
a depressible button;
an electrical switch coupled to the depressible button, the electrical switch configured to output an electrical signal indicative of a position of the depressible button;
a movable electrode coupled to the depressible button;
a stationary electrode positioned parallel to and proximate the movable electrode;
a dielectric positioned between and electrically insulating the movable electrode and the stationary electrode; and
an electrical circuit coupled to the movable and the stationary electrode, the electrical circuit configured to apply a voltage potential difference between the movable electrode and the stationary electrode thereby causing an attractive electrostatic force between the stationary and movable electrodes that imparts a resistance to movement of the depressible button, the attractive electrostatic force configured to change based on the position of the depressible button.

2. The peripheral device of claim 1 wherein the stationary electrode comprises a pair of parallel plates and the movable electrode is at least partially positioned between the pair of parallel plates.

3. The peripheral device of claim 1 wherein the electrical circuit is configured to change the applied voltage potential difference based on a position of the depressible button.

4. The peripheral device of claim 1 wherein the electrical circuit is configured to discharge the applied voltage potential difference in response to the depressible button passing a threshold distance.

5. The peripheral device of claim 1 wherein the depressible button is one of a plurality of depressible buttons and the applied voltage potential difference can be different for each depressible button.

6. The peripheral device of claim 1 wherein the depressible button is a key of a keyboard.

7. The peripheral device of claim 1 wherein the depressible button is a selection button of a mouse.

8. A computer peripheral device comprising:
a depressible button coupled to an electrical switch, the electrical switch configured to output an electrical signal indicative of a position of the depressible button;
a first electrode coupled to the depressible button;
a second electrode positioned adjacent the first electrode; and
a dielectric positioned between the first and the second electrodes,
wherein the first and second electrodes and the dielectric comprise an electrostatic brake configured to cause an attractive electrostatic force between the first and second electrodes that imparts a resistance to movement of the depressible button, the attractive electrostatic force configured to change based on the position of the depressible button causing a corresponding position-based force profile for the depressible button.

9. The peripheral device of claim 8 wherein the first electrode is a movable electrode and moves with the depressible button.

10. The peripheral device of claim 8 further comprising an electrical circuit configured to apply a voltage potential difference across the first and the second electrodes.

11. The peripheral device of claim 10 wherein the electrical circuit is configured to change the applied voltage potential difference in response to the position of the depressible button.

12. The peripheral device of claim 10 wherein the electrical circuit is configured to discontinue applying the voltage potential difference in response to the depressible button passing a threshold distance.

13. The peripheral device of claim 8 wherein the depressible button is a key of a keyboard.

14. A method of operating a button on a computer peripheral device, the method comprising:
receiving position data from a position sensor by an electric circuit, the position data corresponding to a position of the button over a range of motion;
determining, by the electrical circuit, the position of the button over the range of motion based on the position data, the button configured to move relative to a base portion of the computer peripheral device over the range of motion;
dynamically modifying a voltage potential difference between a movable electrode configured on the button and a stationary electrode configured on a base portion of the computer peripheral device based on the determined position of the button, the voltage potential difference causing an attractive electrostatic force between the stationary and movable electrodes that imparts a resistance to movement of the button, the attractive electrostatic force configured to change based on the position of the button.

15. The method of claim 14 wherein the position sensor is at least one of:
a capacitive sensor;
an inductive sensor; or
a Hall effect sensor.

16. The method of claim 14 wherein the voltage potential difference is dynamically modified to cause a corresponding position-based force profile for the button.

17. The method of claim 16 wherein the force profile is a non-linear profile that approximates a clicky feel for keyboard key.

18. The method of claim 14 wherein the computer peripheral device is a keyboard and the button is a keyboard key.

19. The method of claim 14 wherein the computer peripheral device is a mouse and the button is a mouse button.

* * * * *